(12) United States Patent
Hauzenberger et al.

(10) Patent No.: US 8,373,376 B2
(45) Date of Patent: Feb. 12, 2013

(54) DRIVE SYSTEM AND METHOD FOR ACTIVATING THE SAME

(75) Inventors: Stefan Hauzenberger, Potsdam (DE); Bernhard Hauber, Weiler (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 988 days.

(21) Appl. No.: 12/215,237

(22) Filed: Jun. 26, 2008

(65) Prior Publication Data
US 2010/0001674 A1 Jan. 7, 2010

(30) Foreign Application Priority Data
Jun. 29, 2007 (DE) .................. 10 2007 030 059

(51) Int. Cl.
 *G05D 1/00* (2006.01)
 *B64C 13/50* (2006.01)

(52) U.S. Cl. ........ 318/564; 318/563; 318/565; 244/194; 340/945

(58) Field of Classification Search .............. 244/194, 244/203, 213, 215; 340/945, 686.1; 318/560, 318/563, 564, 565, 568.16, 583, 618, 650, 318/721, 778, 779, 782, 799
See application file for complete search history.

(56) References Cited

U.S. PATENT DOCUMENTS

| | | | |
|---|---|---|---|
| 4,745,815 A | | 5/1988 | Klopfenstein |
| 5,655,636 A | | 8/1997 | Lang et al. |
| 5,680,124 A | * | 10/1997 | Bedell et al. .................. 340/945 |
| 5,686,907 A | * | 11/1997 | Bedell et al. .................. 340/945 |
| 5,743,490 A | * | 4/1998 | Gillingham et al. ......... 244/99.9 |
| 5,950,774 A | * | 9/1999 | Lang et al. ..................... 188/134 |
| 6,299,108 B1 | * | 10/2001 | Lindstrom et al. ............ 244/213 |
| 7,354,022 B2 | * | 4/2008 | Richter et al. ................. 244/194 |
| 7,921,729 B2 | * | 4/2011 | Conner et al. .................. 73/783 |
| 8,132,763 B2 | * | 3/2012 | Schievelbusch .............. 244/215 |
| 8,256,718 B2 | * | 9/2012 | Fleddermann et al. ....... 244/194 |
| 2006/0113933 A1 | | 6/2006 | Blanding et al. |
| 2007/0080261 A1 | * | 4/2007 | Neumann et al. ............. 244/194 |
| 2007/0145180 A1 | * | 6/2007 | Johnson et al. ................. 244/13 |

FOREIGN PATENT DOCUMENTS

| | | |
|---|---|---|
| DE | 100 65 367 | 4/2002 |
| DE | 103 08 301 | 7/2004 |
| DE | 103 53 672 | 6/2005 |
| DE | 102004055740 | 1/2006 |
| EP | 873937 | 10/1998 |
| WO | 2005/047108 | 5/2005 |

* cited by examiner

*Primary Examiner* — Eduardo Colon Santana
(74) *Attorney, Agent, or Firm* — Dilworth & Barrese, LLP.

(57) ABSTRACT

This invention discloses a method for activating a drive system for control surfaces or working systems of an aircraft, wherein the speed of a drive unit of the drive system is regulated, and after a starting operation the maximum driving power available during the further operation for speed regulation of the drive unit is reduced. Likewise, this invention comprises a drive system for control surfaces or working systems of an aircraft, comprising a drive unit with speed regulation and a corresponding control.

20 Claims, 2 Drawing Sheets

DRIVE SYSTEM AND METHOD FOR ACTIVATING THE SAME

BACKGROUND OF THE INVENTION

The present invention relates to a method for activating a drive system for control surfaces or working systems of an aircraft, in which the speed of a drive unit of the drive system is regulated. Furthermore, the present invention relates to a corresponding drive system for control surfaces or working systems of an aircraft with a drive unit with speed regulation and a control.

Aircraft control surfaces on the one hand serve as primary control of the position control of the aircraft and on the other hand as secondary control for the configuration of the wing for adaptation of the wing profile to the desired airspeed.

The primary flight control generally comprises the ailerons, side rudders, elevators, and the adjustable tail planes.

The secondary flight control comprises the landing flaps at the trailing edge of the wings, the leading-edge flaps and the brake flaps on the upper surface of the wings.

In modern giant airplanes, all these control surfaces are actuated with either electric or hydraulic energy, which usually is provided by a drive unit and is transmitted to the control surfaces via a transmission.

In addition, airplanes comprise further working systems, so-called Utility Systems, such as freight door drives or thrust reverser drives, which likewise are actuated via hydromechanical or electromechanical drives.

The drive systems usually include overload protections to avoid structural damages in the case of an overload, e.g. by running onto the limit stops, gust loads or by jamming of the mechanical drive elements.

It is known to limit the chamber pressure of the control cylinders in the hydraulic servo actuators of the primary flight control by means of pressure relief valves. Since the actuating force is proportional to the chamber pressure, the response of the pressure relief valve also limits the actuating force.

Another known method, in particular in electromechanical drives of the primary flight control, is to measure the actuating force by means of electric sensors, whose signal is evaluated in an electronic control unit. When a maximum specified load is exceeded, the drive is deactivated.

From US 2006/0113933 A1, a sensor-based method for load limitation for electromechanical actuators is known, in which an inadmissible case of load is detected by measuring the engine input torque.

Both DE 10308301 B3 and DE 2004055740 A1 describe sensor-based electronic devices for limiting overloads in high-lift systems.

In conventional drive systems of the adjustable tail planes, however, mechanical load limiters are frequently used. In the drive systems of the high-lift means, if these are systems with a central drive unit with transmission shafts for power transmission, there are likewise used mechanical load limiters. Such system is shown in FIG. 1. The same comprises a speed-controlled central drive unit 1, which drives the load stations of the wing flaps 8 via a transmission shaft system. The torques initially are transmitted from the drive unit 1 via a transmission shaft to a half-wing branch transmission 3, from which the drivetrains of the two wings are branched off. In each drivetrain, simple transmissions 8 for a change in direction or for gear ratio adaptation and branch transmissions 6 for the load stations of the wing flaps 7 are provided.

The protection against high load peaks in a case of jamming is realized by the installation of station torque limiters in the branch transmissions 6 of the load stations and by half-system torque limiters 4 in the shaft train. The half-system torque limiters 4 are disposed in the transmission between the half-wing branch transmission 3 for the two wing halves and the branch transmissions 6 of the load station of the wing flaps and respond from a maximum total load admissible for the wing train, so that the loads are limited in the region behind the half-system torque limiters 4. In this region, the transmission therefore can be configured as a low-load transmission 5, whereas the transmission from the drive unit up to the half-system torque limiters 4 must be configured as a high-load transmission 2, which increases both weight and costs.

SUMMARY OF THE INVENTION

It now is the object of the present invention to provide a method for activating a drive system and a corresponding drive system in which the dynamic load peaks can be kept low in a case of overload, and which can be realized with rather low weight and at low cost.

In accordance with the invention, this object is solved by a method and drive system as described herein. Advantageous embodiments of the present invention are subject-matter of the description herein.

The present invention is based on the knowledge that because of the transition from static friction to sliding friction mechanical power-transmitting systems require a higher driving torque or a higher driving force at the start of the movement than during the movement. In particular the hydraulic drive motors also have a distinctly lower efficiency for starting than during the movement. The drives, in general hydraulic motors or electric motors, therefore have a distinctly higher torque potential than is necessary for moving the drive systems under operating load. However, this leads to the fact that in the case of an occurring overload, e.g. in the case of jamming, the drive units load the power-transmitting components with very high torque or force peaks as compared to the operating load.

In accordance with the invention, this problem now is solved in that after a starting operation of the drive unit the maximum driving power available during the further operation for speed regulation of the drive unit is reduced. This ensures that in the case of an occurring overload the drive units do not load the subsequent components with the full driving power, so that the overload peaks can be reduced on the whole. The normal operation of the drive system is not impeded thereby, as initially a high driving power is employed to overcome static friction and in the subsequent operation the full driving power is not required anyway.

Advantageously, the full driving power is available during the starting operation. When using hydraulic motors with adjustable absorption volume (variable displacement hydraulic motors, VDHM), the same can e.g. open their wind wing for 100%, and electric motors can receive the full starting current for starting. In. this configuration, the drive unit can also start with maximum power consumption even under unfavorable starting conditions.

Furthermore advantageously, the maximum available driving power is reduced after the starting operation to a value which still is sufficient for the normal movement of the system after the starting operation under maximum operating loads. For example, the maximum deflection of the wind wing of the VDHM is fixed at a value which still is sufficient for moving the system under maximum operating loads and in consideration of the present pressure supply. In the electric drives, the current limitation is adjusted correspondingly.

Thus, the drive unit is capable of operating in the undisturbed mode without a drop in speed, as the driving powers necessary for an undisturbed operation are available for speed regulation. In the case of jamming, on the other hand, the reduction of the driving power ensures that the succeeding elements are not loaded with the full driving power of the drive unit.

Advantageously, the determination as to whether the starting operation is terminated is effected with reference to the rotary position and/or the speed of the drive. When the system detects that the drive has started from the rest position, the maximum driving power available for speed regulation in the drive unit will be reduced. Even if the case of jamming already has existed before starting the drive unit, the same nevertheless will first be started due to the elasticity of the drivetrain, so that power limitation will be effective here as well.

The present invention furthermore comprises a method for activating a drive system for control surfaces or working systems of an aircraft, wherein the speed of a drive unit of the drive system is regulated and a case of overload is detected by comparing a desired speed and a speed determined by means of a speed sensor. In the case of an obstruction in the drive system, the speed of the drive shaft between the point of obstruction and the drive unit is reduced by the increase of the load moments. As a result, an inadmissible difference between the desired speed and the measured actual speed is obtained, which is detected and recognized as an inadmissible course of the load.

For one of skill in the art, it is quite obvious that such recognition of a case of load is of great advantage also independent of the power reduction in accordance with the invention. However, the combination with the power reduction in accordance with the invention after the starting operation has the decisive advantage that due to the power limitation of the engine, the drop in speed already occurs with a lower load exceedance than with full power consumption. Thus, a faulty system condition can be detected earlier, and an excessive rise in moment or force can be avoided. Without the power reduction in accordance with the invention, however, the actual speed only would differ from the desired speed when the operating load exceeds the maximum load of the drive unit in the case of jamming. In the system of the invention, however, a case of overload will be detected earlier.

Advantageously, the driving power is reduced in a case of overload or a braking operation is initiated. It is conceivable that a minor exceedance of the maximum operating load does not immediately lead to stopping the drive, but first of all a reduction of the driving speed is initiated, so that the system still is available with reduced power, and that emergency shut-down is effected only when a further load threshold is exceeded.

Alternatively, a braking operation can be initiated, in particular a braking operation specified by an algorithm as it is known from DE 102004055740 A1, which is fully incorporated herein by reference.

Furthermore advantageously, the speed of the drive unit is regulated by means of a speed sensor, whereas a further speed sensor is disposed at a point of the transmission between the drive unit and the control surfaces or working systems and serves the detection of a case of overload. Since the further speed sensor hence is disposed closer to the possible jamming points, this provides for a faster detection of cases of overload, without an inadmissible torque having been built up in the entire drivetrain. The regulation of the engine speed thus is effected by means of a sensor incorporated in the engine, whereas the speed signal from the further speed sensor exclusively serves the monitoring function, in order to detect a case of overload. As a result, in particular the load acting on the transmission between the drive unit and the further speed sensor is reduced considerably, as for a response of the overload protection in accordance with the invention, merely a speed difference between the desired speed at the place of the further speed sensor and the speed actually measured there is sufficient, without the drive unit already loading the entire system against the blocking force at the point of obstruction.

By the method of the invention, the peak load of the power-carrying system components can be reduced considerably, so that weight and costs can distinctly be reduced as compared to the prior art.

The present invention furthermore comprises a drive system for control surfaces or working systems of an aircraft, comprising a drive unit with speed regulation and a control, wherein the control includes a power reduction function which after a starting operation reduces the maximum driving power available during the further operation for speed regulation of the drive unit. By means of such drive system, the same advantages are obtained as described already with respect to the method. The control of the drive system automatically performs the power reduction during the operation.

Furthermore advantageously, the control is configured such that it automatically performs the methods described above. This again provides the advantages described above.

Advantageously, the drive unit is a fast-controllable drive unit, in particular a hydraulic motor with adjustable absorption volume or a brushless electric motor. These modern, fast-controllable drive units facilitate the practical application of the method of the invention, in order to realize differently adapted power limitations in the control for starting and for the condition of movement. In particular, unnecessary loads of the system are avoided thereby, and the new possibility for detecting occurring overloads as described above is opened up thereby.

Advantageously, the control includes an electronic sensor-based system for detecting a case of overload. In particular, the mechanical torque limiters, at least the half-system torque limiters, as known from the prior art can be omitted thereby. Likewise, the entire system can be constructed lighter in weight.

The present invention furthermore includes a drive system for control surfaces or working systems of an aircraft, comprising a drive unit with speed regulation and a control, wherein the drive system includes a speed sensor for determining the speed of the drive unit and/or the transmission, and a case of overload is detected by comparing a desired speed and a speed determined by means of the speed sensor. In particular in conjunction with the maximum power of the drive unit reduced during operation, the actual speed will differ from the desired speed at an early time, e.g. in a case of jamming, so that a case of overload is detected without the drive unit loading the system with the maximum force.

Advantageously, the drive unit includes a speed sensor, by means of which the speed of the drive unit is regulated, whereas a further speed sensor is disposed at a point of the transmission and serves the detection of a case of overload. Advantageously, the speed sensors are integrated either in one of the drivetrain transmissions or in the branch transmission of the first load station, so that they replace the mechanical half-wing torque limiter as used in the prior art. In the case of an obstruction in the drive system, the speed of the drivetrain transmission or of the branch transmission is reduced by an increase in the load moments, so that an inadmissible difference between the desired speed and the measured actual speed is detected at this point, whereupon the control detects a case of overload and takes corresponding countermeasures.

BRIEF DESCRIPTION OF THE DRAWINGS

The present invention will now be explained in detail with reference to an embodiment and the drawings, in which.

DESCRIPTION OF THE PREFERRED EMBODIMENTS

Figure 1:
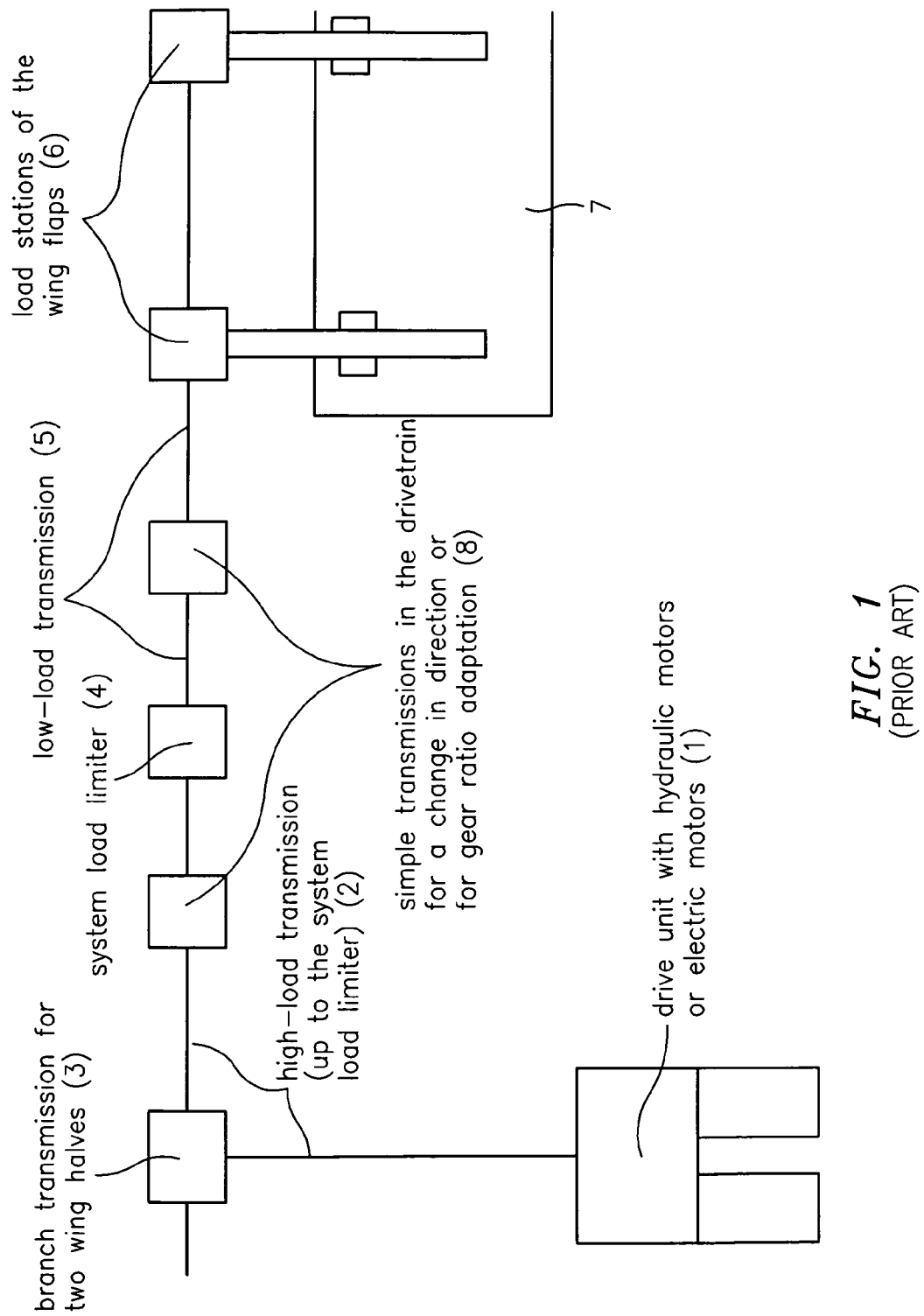
FIG. 1 shows a drive system for control surfaces of an aircraft in accordance with the prior art.

The prior art drive system as shown in FIG. 1 has already been described above.

Figure 2:
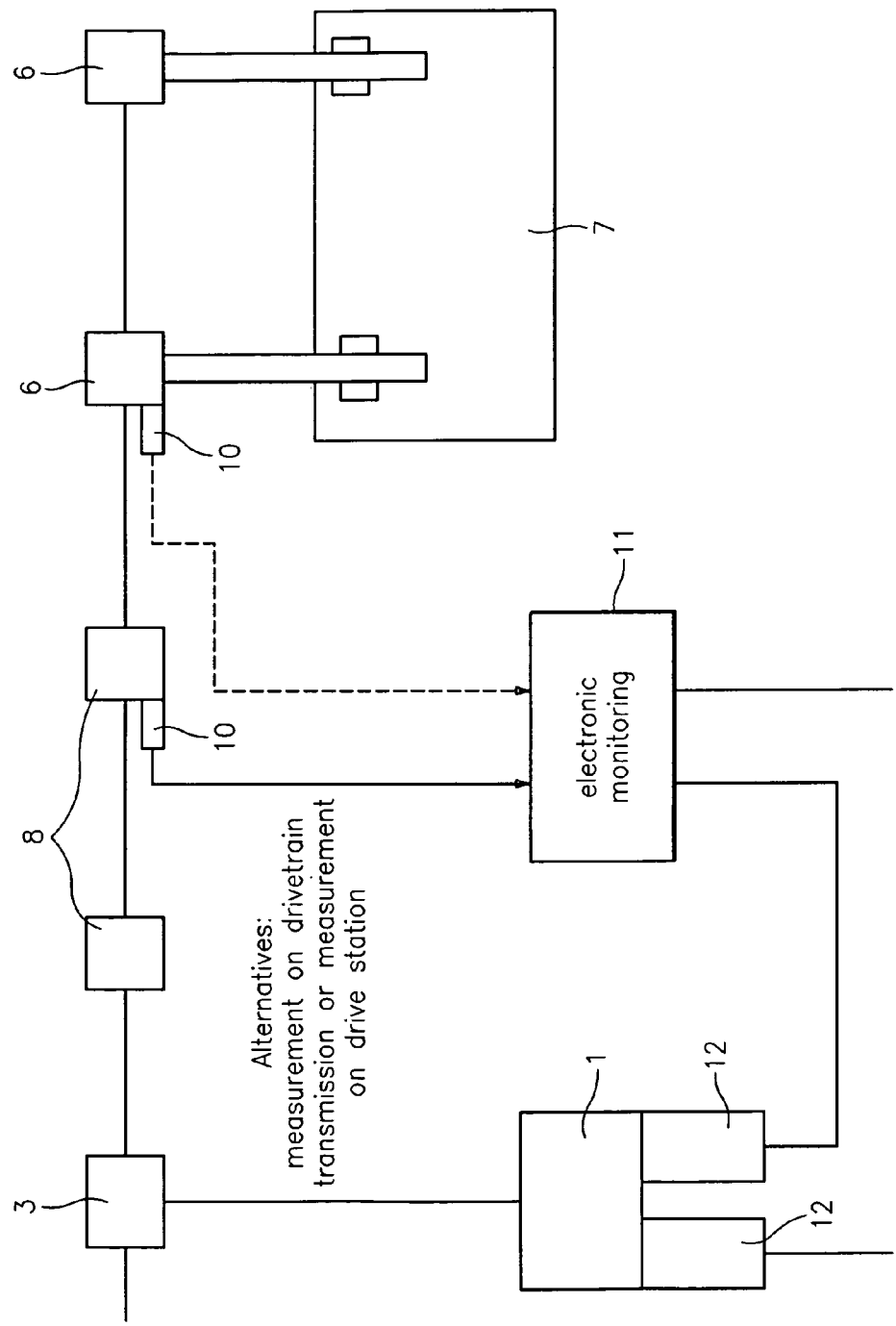
FIG. 2 shows an embodiment of the drive system of the invention for control surfaces of an aircraft.

The drive system of the invention as shown in FIG. 2 now comprises a central drive unit 1 with electric or hydraulic drive motors 12, wherein the speed of the drive unit is regulated via a sensor incorporated in the drive.

A transmission extends from the central drive unit first to a branch transmission 3 for the two wing halves. From here, the transmission is branched onto the two wings, with only one wing being shown in FIG. 2. In the drivetrain of the wings, the transmissions 8 e.g. for the change in direction or for gear ratio adaptation are disposed, whereas the load stations of the wing flaps are driven by the transmission via branch transmissions 6.

There is provided an electronic control 11, which activates the central drive unit 1 and in accordance with the invention provides an unlimited power supply of the drive motors 12 for the starting operation, i.e. a VDHM can open its wind wing for 100%, and electric motors can receive the full starting current for starting. In this configuration, the drive unit 1 can start with maximum power consumption under the unfavorable starting conditions. Upon starting, the control 11 limits the maximum deflection of the wind wing of the VDHM to a value which just is sufficient for moving the system under maximum operating loads and in consideration of the present pressure supply. The power limitation is adjusted correspondingly in the electric drives. Thus, the drive unit is capable of operating in the undisturbed mode without a drop in speed.

Furthermore, the electronic control 11 receives data from a speed sensor 10, which is disposed either on one of the drivetrain transmissions 8 or on a branch transmission 6 of the first load station.

When the operating load now rises above a defined maximum value, the measured actual speed will differ from a commanded desired speed, which indicates a malfunction in the system due to an inadmissibly high operating load. For instance in the case of an obstruction in the drive system, the speed of the drive shaft between the point of obstruction and the drive unit is reduced by the increase in the load moments. As a result, an inadmissible difference between the desired speed and the measured actual speed is obtained, which is detected and recognized as an inadmissible course of the load. For this purpose, the control 11 compares the signal from the speed sensor 10 with a desired speed, with an excessive difference being recognized as an inadmissible course of the load. Thereupon, the control electronics performs a braking operation specified by an algorithm, which can be performed as described in DE 10200455740 A1, and hence also has the advantages described therein. In the system of the invention, the data from the speed sensor 10 merely serve the monitoring for detecting an overload, whereas the speed regulation is effected by means of a sensor incorporated in the drive.

Due to the power limitation of the engine in accordance with the invention, the drop in speed already occurs with a lower load exceedance than with full power consumption. Hence, a faulty system condition is detected at an early time, and the electronic control unit can deactivate the central drive by a defined cut-off with or only with little rise in moment or force.

In an alternative aspect of the invention, the speed sensors integrated in the drivetrain transmissions or branch transmissions can also be replaced by sensors for measuring the reaction moments of these transmissions. For this purpose, the drivetrain transmission must be torque-transmitting, in order to produce a measurable reaction moment. In this configuration, however, the sensor signal is monitored as to whether a maximum admissible threshold value is exceeded.

In the method of the invention or in the control of the invention, the half-system load limiters 4 necessary in the conventional system can be omitted, whereas the peak load of the power-carrying system components is considerably reduced at the same time. System weight and system costs are distinctly reduced thereby as compared to the prior art.

The invention claimed is:

1. A method for activating a drive system for control surfaces (7) or working systems of an aircraft, comprising the steps of
    regulating speed of a drive unit of the drive system to provide maximum driving power available during starting operation and transition from static to sliding friction at start of movement,
    after the starting operation is completed, reducing the maximum driving power available during the further operation for speed regulation of the drive unit, and
    after maximum driving power has been reduced, separately further reducing the driving power should a subsequent overload or lamming be detected.

2. The method according to claim 1, wherein the full driving power is available during the starting operation.

3. The method according to claim 1, wherein after the starting operation the maximum available driving power is reduced to a value which is just sufficient for the normal movement of the system after the starting operation under maximum operating loads.

4. The method according to claim 1, wherein the determination as to whether the starting operation is terminated is effected with reference to the rotary position and/or the speed of the drive.

5. The method in particular according to claim 1, wherein a case of overload is detected by comparing a desired speed and a speed determined by means of a speed sensor.

6. The method according to claim 5, wherein in a case of overload the driving power is reduced or a braking operation is initiated.

7. The method according to claim 5, wherein the speed of the drive unit is regulated by means of a first speed sensor, and a further speed sensor is disposed at a point of the transmission between the drive unit and the control surfaces or working systems and serves the detection of a case of overload.

8. A drive system for control surfaces (7) or working systems of an aircraft, comprising
    a drive unit (1) in turn provided with speed regulation and a control, and the control including means for providing maximum driving power available during a starting operation and including a power reduction function which, after the starting operation and transition from static to sliding friction at start of movement is completed, reduces the maximum driving power available during the further operation for speed regulation of the drive unit (1) and, in event of detection of an overload or jamming after starting operation is completed and maximum driving power reduced, further reduces the driving power.

9. The drive system according to claim 8, wherein the control is configured such that it automatically performs the method for activating a drive system for control surfaces or working systems of an aircraft, wherein the speed of a drive unit of the drive system is regulated, and after a starting operation the maximum driving power available during the further operation for speed regulation of the drive unit is reduced.

10. The drive system according to claim 8, wherein the drive unit is a fast-controllable drive unit.

11. The drive system according to claim 10, wherein the control includes an electronic sensor-based system for detecting a case of overload.

12. The drive system in particular according to claim 11, comprising a speed sensor for determining the speed of the drive unit and/or of the transmission, wherein a case of overload is detected by comparing a desired speed and a speed determined by means of the speed sensor.

13. The drive system according to claim 12, wherein the drive unit includes a speed sensor, by which the speed of the drive unit is regulated, and a further speed sensor is disposed at a point of the transmission and serves the detection of a case of overload.

14. The drive system in particular according to claim 10, comprising a speed sensor for determining the speed of the drive unit and/or of the transmission, wherein a case of overload is detected by comparing a desired speed and a speed determined by means of the speed sensor.

15. The drive system according to claim 10, wherein the fast-controllable drive unit is a hydraulic motor with adjustable absorption volume or a brushless electric motor.

16. The drive system according to claim 8, wherein the control includes an electronic sensor-based system for detecting a case of overload.

17. The drive system according to claim 16, wherein the drive unit includes a speed sensor, by which the speed of the drive unit is regulated, and a further speed sensor is disposed at a point of the transmission and serves the detection of a case of overload.

18. The drive system according to claim 17, wherein the further speed sensor is disposed on a drive train transmission or a branch transmission of the transmission.

19. The drive system in particular according to claim 16, comprising a speed sensor for determining the speed of the drive unit and/or of the transmission, wherein a case of overload is detected by comparing a desired speed and a speed determined by means of the speed sensor.

20. The drive system in particular according to claim 8, comprisicng a speed sensor for determining the speed of the drive unit and/or of the transmission, wherein a case of overload is detected by comparing a desired speed and a speed determined by means of the speed sensor.

* * * * *